(12) United States Patent
Liu et al.

(10) Patent No.: US 9,990,949 B1
(45) Date of Patent: Jun. 5, 2018

(54) MULTI-CHANNEL DATA RECORDING

(71) Applicant: Seagate Technology LLC, Longmont, CO (US)

(72) Inventors: Xiong Liu, Shugart (SG); WenXiang Xie, Shugart (SG); Kai Yang, Shugart (SG); Quan Li, Shugart (SG)

(73) Assignee: Seagate Technology LLC, Cupertino, CA (US)

( * ) Notice: Subject to any disclaimer, the term of this patent is extended or adjusted under 35 U.S.C. 154(b) by 0 days. days.

(21) Appl. No.: 15/695,385

(22) Filed: Sep. 5, 2017

(51) Int. Cl.
| | |
|---|---|
| G11B 5/09 | (2006.01) |
| G11B 5/55 | (2006.01) |
| G11B 5/012 | (2006.01) |
| G06F 12/0868 | (2016.01) |
| G06F 12/0866 | (2016.01) |
| G06F 12/0804 | (2016.01) |

(52) U.S. Cl.
CPC ............ G11B 5/5539 (2013.01); G11B 5/012 (2013.01); G06F 12/0804 (2013.01); G06F 12/0866 (2013.01); G06F 12/0868 (2013.01); G06F 2212/312 (2013.01); G06F 2212/313 (2013.01)

(58) Field of Classification Search
None
See application file for complete search history.

(56) References Cited

U.S. PATENT DOCUMENTS

| | | | |
|---|---|---|---|
| 8,959,281 B1 * | 2/2015 | Malina | G06F 12/0246 711/103 |
| 9,269,376 B1 * | 2/2016 | Hess | G11B 5/012 |
| 2014/0098438 A1 * | 4/2014 | Poudyal | G11B 5/012 360/55 |
| 2015/0212938 A1 * | 7/2015 | Chen | G06F 12/023 711/166 |
| 2015/0294684 A1 | 10/2015 | Qjang et al. | |
| 2016/0012849 A1 | 1/2016 | Feldman | |
| 2016/0012850 A1 | 1/2016 | Feldman | |
| 2016/0034342 A1 * | 2/2016 | Toh | G06F 11/1044 714/721 |
| 2016/0283115 A1 | 9/2016 | Gaertner et al. | |
| 2017/0003894 A1 * | 1/2017 | Hess | G06F 12/0802 |
| 2017/0011769 A1 * | 1/2017 | Shang | G11B 20/1816 |
| 2017/0075583 A1 * | 3/2017 | Alexander | G06F 3/0605 |
| 2017/0090763 A1 * | 3/2017 | Horn | G06F 3/0604 |
| 2017/0147215 A1 * | 5/2017 | Cronauer | G06F 3/064 |
| 2017/0200468 A1 | 7/2017 | Zhu et al. | |
| 2017/0200469 A1 | 7/2017 | Qiang et al. | |
| 2017/0220264 A1 * | 8/2017 | Sokolov | G06F 3/0608 |
| 2017/0329525 A1 * | 11/2017 | Simonson | G06F 3/0605 |

\* cited by examiner

*Primary Examiner* — Tan X Dinh

(74) *Attorney, Agent, or Firm* — Duft Bornsen & Fettig LLP; Gregory T. Fettig

(57) ABSTRACT

Embodiments described herein are operable with a storage device. In one embodiment, a method provides for buffering first portions of incoming sequential data from a plurality of channels in a buffer, and identifying locations of the storage device to store the first portions of the incoming sequential data. The method also provides for directly writing the first portions of the incoming sequential data from the buffer to the identified locations of the storage device.

36 Claims, 11 Drawing Sheets

MULTI-CHANNEL DATA RECORDING

SUMMARY

Embodiments described herein provide multi-channel data storage. In one embodiment, a method provides for buffering first portions of incoming sequential data from a plurality of channels in a buffer, and identifying locations of the storage device to store the first portions of the incoming sequential data. The method also provides for directly writing the first portions of the incoming sequential data from the buffer to the identified locations of the storage device.

The various embodiments disclosed herein may be implemented in a variety of ways as a matter of design choice. For example, some embodiments herein are implemented in hardware whereas other embodiments may include processes that are operable to implement and/or operate the hardware. Other exemplary embodiments, including software and firmware, are described below.

BRIEF DESCRIPTION OF THE DRAWINGS

Some embodiments are now described, by way of example only, and with reference to the accompanying drawings. The same reference number represents the same element or the same type of element on all drawings.

FIGS. 5A and 5B illustrate an exemplary data storage technique to a shingled magnetic recording medium.

DETAILED DESCRIPTION OF THE FIGURES

Figure 1:
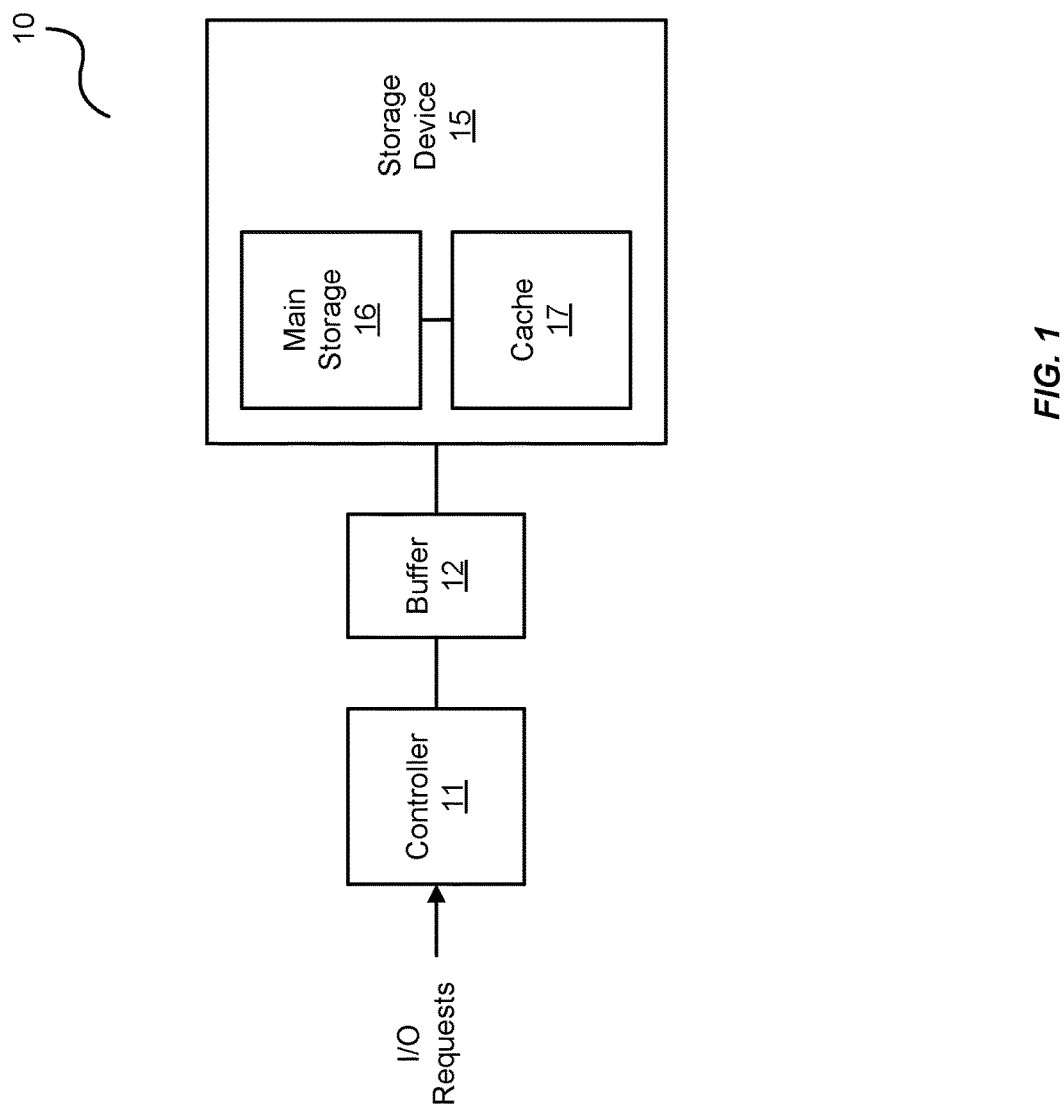
FIG. 1 is a block diagram of an exemplary storage system.

The figures and the following description illustrate specific exemplary embodiments. It will thus be appreciated that those skilled in the art will be able to devise various arrangements that, although not explicitly described or shown herein, embody the principles of the embodiments. Furthermore, any examples described herein are intended to aid in understanding the principles of the embodiments and are to be construed as being without limitation to such specifically recited examples and conditions. As a result, this disclosure is not limited to the specific embodiments or examples described below.

Disk drives typically include one or more sliders configured with read and write heads. An actuator/suspension arm holds a slider above a magnetic disk. When the magnetic disk rotates, air flow generated by the rotation of the magnetic disk causes an air bearing surface (ABS) of the slider to fly at a particular height above the magnetic disk. As the slider flies on the ABS, a voice coil motor (VCM) moves the actuator/suspension arm to position the read and write heads over selected tracks of the magnetic disk.

Tracks and sectors of magnetic disks can be configured in a variety ways. For example, data regions of the magnetic disk are generally separated by the servo sectors, either arcuate that curve from the inner diameter to the outer diameter of the disk or relatively straight from the inner diameter to the outer diameter of the disk. The tracks are divided into multiple circumferential sectors separated by the servo sectors and are used to store user data, such as digital video files, digital music files, digital documents, etc.

In a configuration called shingled magnetic recording (SMR), tracks overlap each other like shingles on a roof. This track configuration process increases the areal density of the magnetic disk and thus the number of magnetic bits that the disk can store. However, this configuration can disturb adjacent tracks because the write head, when writing to one track, also overlaps an adjacent track. So, a controller generally directs the read head to read data in the adjacent track, then marks the location of the read data on the disk as invalid, and subsequently directs the write head to write the data to another location on the magnetic disk (and/or the controller stores the data in a buffer), such that the data can be re-written later to a main storage area of the magnetic disk (e.g., when that data is modified). This is a process that is similar to "garbage collection" in Solid State Drive (SSD) architectures.

The systems and methods herein increase the throughput of the data such that portions of the data can be written directly to the magnetic disks to avoid disturbing adjacent tracks, particularly when the data is sequential. For example, some data, such as that coming from digital video recorders (DVRs) and security cameras, stream data to the storage device. But, the controller embodiments herein handle this data by identifying portions of the magnetic disk where data can be written without disturbing the adjacent tracks (e.g., by writing to adjacent sectors of the magnetic disk).

Since the embodiments herein are operable to read data from tracks, mark those tracks as invalid, and then rewrite the data later to other tracks, these embodiments may find advantages in other storage architectures like SSDs. For example, an SSD comprises memory cells that are arranged in "pages", which are further arranged in "blocks". And, the blocks are arranged on a "plane" of a die. The controller in such a case writes data to the pages of the blocks and manages how and where that data is stored and changed via subsequent I/O requests.

When a write I/O request is received by the controller, the controller processes the I/O request and stores the data in individual pages of a storage block. The remaining pages are "free" and open to store data as determined by the controller. But, when a subsequent I/O request causes changes and/or additions to the data pages, the controller writes the new data to other pages of the block. The changed data resulting from the I/O request is written to other pages, and the original data is marked as invalid. Once the block is full (even though some pages of the block are marked as invalid), nothing else can be written to the block until it is erased.

So, when the controller of an SSD seeks to free up space in the SSD, the controller relocates valid data to other blocks. The controller then writes the data pages containing the changed data as well as the additional data to another block. Once that data is written to the other block, the controller erases the previous block, thereby freeing the pages of that block for subsequent writing.

Whereas SMR media writing can disturb data in adjacent tracks, SSDs can suffer from an effect called "read disturb" where multiple reads of a block can disturb data in cells of that block. And, while reading and writing are two different operations, blocks containing the disturbed data may need garbage collection from time to time. Since the controller may need to identify of locations in the SSD to relocate data, the embodiments herein may also find use in SSDs and the like.

With this in mind, FIG. 1 is a block diagram of an exemplary storage system 10. The storage system 10 includes a controller 11, a buffer 12, and a storage device 15. The controller 11 is operable to process Input/Output (I/O) requests to the storage device 15 to write data to and read data from the storage device. For write I/O requests, the controller 11 may buffer portions of the write I/O requests in the buffer 12 prior to storing the data thereof with the storage device 15. For example, the storage system may be operable to process write I/O requests from a plurality of channels (e.g., DVRs, security cameras, and the like) to store relatively large amounts of data sequentially in the storage device 15. As the data is arriving, the controller 11 may buffer a portion of the data in the buffer 12 and identify locations in a main storage area 16 of the storage device 15 to quickly store the data and free up the buffer 12. Subsequent portions of the sequential data may be written to a cache 17 of the storage device 15 and re-written to the main storage 16 of the storage device 15 when it comes available.

In this regard, the controller 11 is any device, software, firmware, or combination thereof operable to store data with the storage device 15. The buffer 12 is any device, software, firmware, or combination thereof operable to buffer data until it can be stored in the storage device 15. Generally, the buffer 12 size has a limitation and the data is to be written to the storage device 15 when the buffer 12 is full and the host requests to clear the buffer 12, generally referred to as a "cache flush". When the buffer 12 is not full, the buffer 12 can accept new data (e.g., from a host) to write to the storage device 15. Examples of the buffer 12 include Dynamic Random Access Memory (DRAM), non-volatile flash memory, and the like. The storage device 15 is any device, software, firmware, or combination thereof operable to store data. Examples of the storage device include magnetic recording mediums (e.g., Shingled Magnetic Recording (SMR) mediums), non-volatile flash memory devices, resistive storage devices, and the like.

Figure 2:
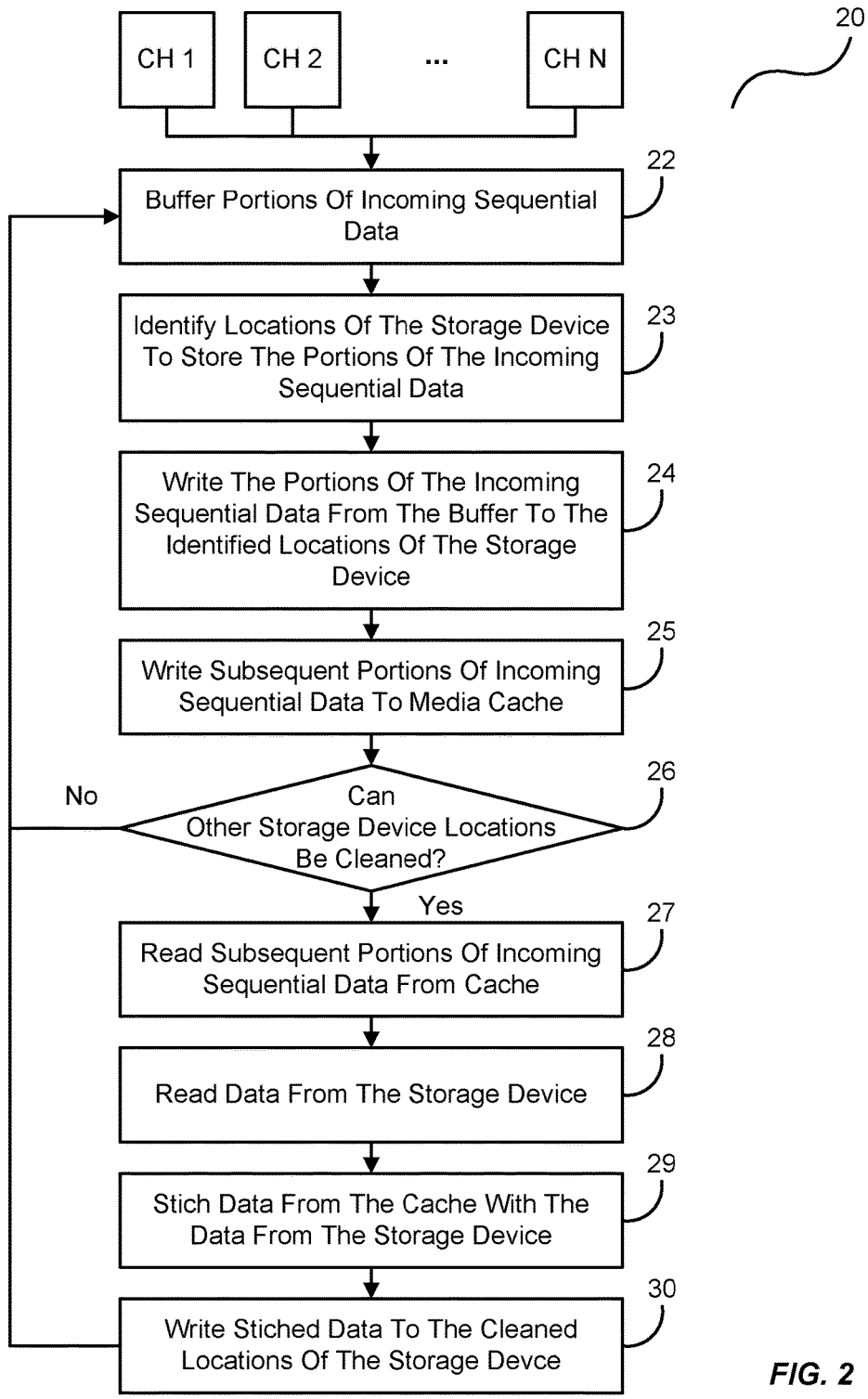
FIG. 2 is a flowchart of an exemplary process of the storage system of FIG. 1.

FIG. 2 is a flowchart of an exemplary process of the storage system 10 of FIG. 1. In this embodiment, the controller 11 processes I/O requests from a plurality of channels CH 1-CH N (where the reference number "N" indicates an integer greater than 1 and not necessarily equal to any other "N" reference number used herein). The channels CH 1-CH N, in this embodiment, are streaming sequential data for storage of the data to the storage device 15. For example, a security camera may be continually observing a scene. The camera may continually digitize and record that observance of the scene and stream the associated video data to the storage device 15 for storage therewith. As there are generally no breaks in the recording, the streaming data is sequential in nature although such data may be broken up into multiple I/O requests for sequential storage in the storage device 15. And, there may be multiple channels attempting to store data at the same time with the storage device 15.

The controller 11 upon receiving this data buffers portions of the incoming sequential data in the buffer 12, in the process element 22. For example, as the data is streaming, the controller 11 may buffer a first portion of the streaming data from the channel CH 1, buffer a first portion of the streaming data from the channel CH 2, and so on. To free up the buffer 12 for subsequent portions of the streaming data from the channels CH 1-CH N, the controller 11 identifies locations of the main storage area 16 of the storage device 15 to store the portions of the incoming sequential data, in the process element 23. For example, a host system generally decides where data is to be written on the storage device 15. The controller 11, however, may decide whether to write the data to the host's target location or to a media cache. If the data is written to the media cache, the controller 15 may later move the data to host's target location in order to improve data throughput (e.g., performance). And, as the data is sequential in nature, the data should be stored in the manner it was received so that it can be read in similar fashion without having to search the entire main storage area 16 of the storage device 15 for the data.

Once the locations in the storage device 15 have been identified, the controller 11 writes the portions of the incoming sequential data from the buffer 12 to the identified locations of the main storage area 16 of the storage device 15, in the process element 24. Thereafter, as subsequent portions of the incoming sequential data come in and are buffered in the buffer 12, the controller 11 may write these subsequent portions of sequential data to a media cache, such as the cache 17 of the storage device 15, in the process element 25.

Then, the controller may ascertain other storage device locations that can be "cleaned", in the process element 26. For example, adjacent tracks in an SMR media example of the storage device 15 may be disturbed when writing sequential data to particular tracks. Accordingly, the controller 11 accounts for this and marks the adjacent tracks as invalid after relocating the data to the cache 17 or some other location such as the buffer 12. In this regard, if adjacent tracks can be identified for cleaning, the controller 11 may read the subsequent portions of the incoming sequential data from the cache 17, in the process element 27, and read the existing data from the main storage area 16 of the storage device 15 where the tracks of the SMR media can be cleaned, in the process element 28. The controller 11 may then stitch the data from the cache 17 together with the data from the tracks to be cleaned in the main storage area 16 of the storage device 15, in the process element 29. This process may be performed in the cache 17 or in the buffer 12 such that the controller 11 can write the stitched data to the cleaned locations of the main storage area 16 of the storage device 15, in the process element 30. The process then returns to the process element 22 to continue buffering portions of the incoming sequential data. However, if other locations of the main storage area 16 of the storage device 15 cannot be identified for cleaning (the process element 26), then the controller 11 may buffer the subsequent portions of the incoming sequential data in the buffer 12, in the process element 22.

It should be noted that the process 20 is exemplary and not intended to be limiting. For example, while the systems and methods herein provide for writing more data directly to the main storage area of an SMR storage device as opposed to the media cache of the SMR storage device (e.g., because the data in the media cache eventually needs to be moved to main storage area), the process 20 may also be applicable to other storage devices such as SSDs and the like. The process elements thereof may also be rearranged or changed while still embodying the principles of directly writing sequential data to the storage device 15.

Figure 3:
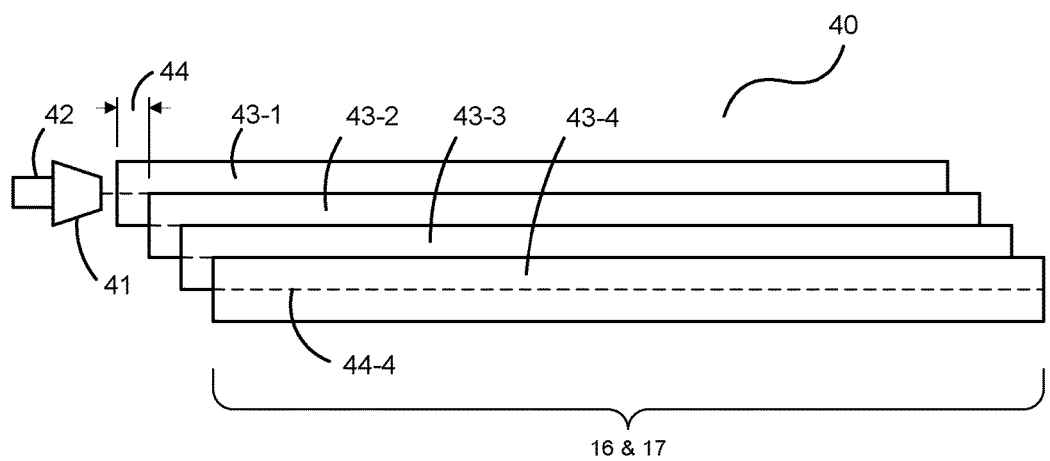
FIG. 3 is a block diagram of tracks of a shingled magnetic recording medium.

FIG. 3 is a block diagram of tracks 43 of a SMR medium which may be used to implement the main storage area 16 and the cache 17 of the storage device 15. As mentioned, the tracks 43 of an SMR medium are shingled upon one another like shingles on a roof. Typically, the tracks 43 are organized in bands (e.g., the band 40) and each track 43 has an offset 44 from a previous track. The last track (e.g. 43-4) of the band 40 is generally referred to as the "fat track" while the other tracks (43-1-43-3) of the band 40 that overlap are generally referred to as the "slim tracks". Generally, each band of tracks 43 in an SMR medium is separated by a guard band where user data (e.g., digital video files, digital audio files, data files, etc.) is not written.

When the controller 11 writes data to a particular track, such as the track 43-1, the controller 11 directs the write head 41 to magnetically write along a path 44 in the track 43. But, because the write head 41 is wider than the slim tracks 43, the write head 41 disturbs the data in a lower adjacent track, including the fat track 43-4. So, the controller 11 can read this data ahead of time via the read head 42 during the cleaning process such that data can be written thereto, as described above. But, in the case of sequential data, there is generally no need to read the data since new data (e.g., from the host system) should be in the buffer 12 and ready for writing. It should be noted that the offset 44 (e.g., the first data sector offset) may exist with both conventional magnetic recording (CMR) and SMR. The offset is used to the time needed to seek to a next track. And, a logical block address (LBA) will continue from track 1 to track 2 after considering offset 44.

Figure 4:
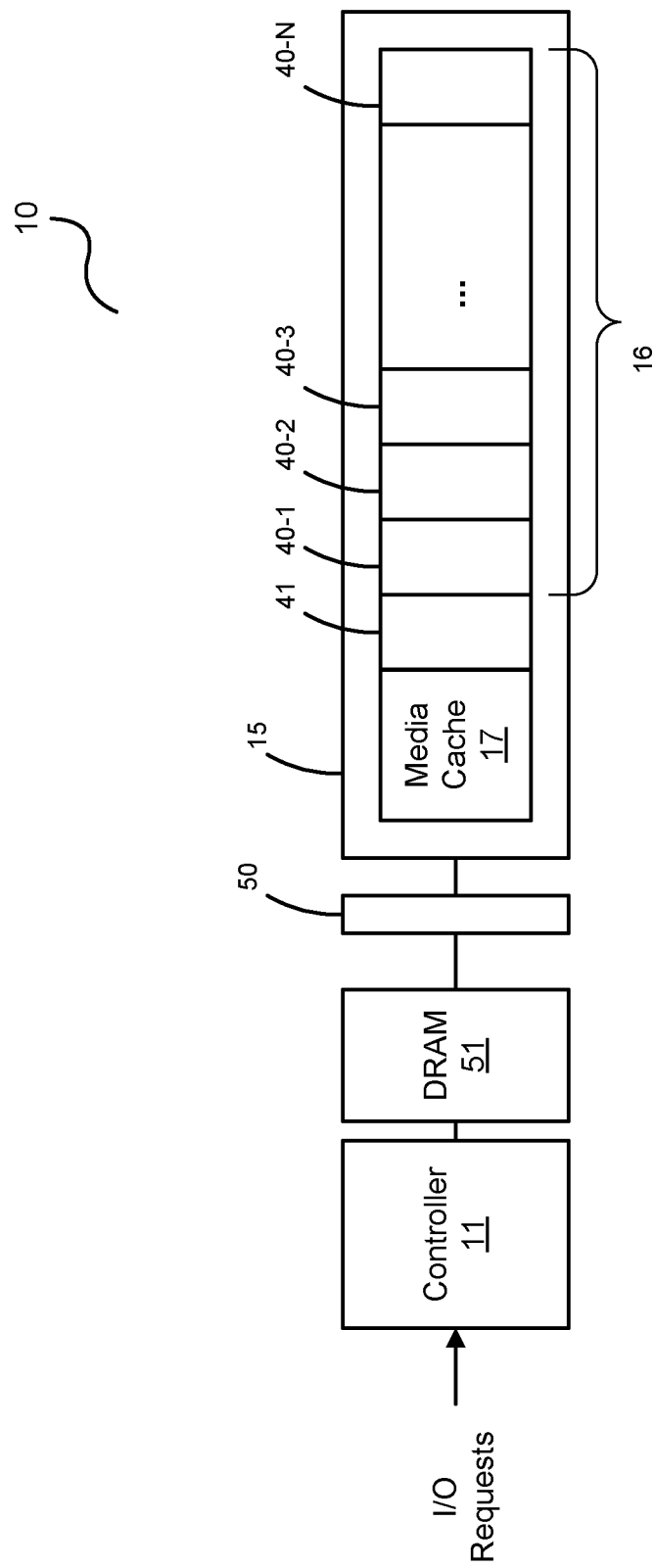
FIG. 4 is a block diagram of an exemplary storage system employing a shingled magnetic recording medium.

FIG. 4 is a block diagram of an exemplary storage system employing an SMR medium as the storage device 15. In this embodiment, the buffer is a DRAM 51 while the media cache 17 and main storage area 16 are configured on the SMR medium. The main storage area 16 may be configured with a plurality of bands 40-1-40N where user data is stored. The SMR medium may also include other regions like a media scratchpad 41, a temporary data storage that may be used for a band rewrite operation. The media scratchpad 41 may be a standalone region of the recording medium or it may be configured with the media cache 17. This embodiment also includes an abstraction layer 50 which maps incoming data from the DRAM 51 to a virtual LBA location such that data from the DRAM 51 can be written to the media cache 17 and/or the bands 40 of the main storage area 16.

Generally, in SMR, data is written to the DRAM 51, which is then directed to the media cache 17 through the abstraction layer 50 as part of a BRO. For example, the abstraction layer 50 may be a firmware feature operable to manage data during a BRO. Then, when the data in the media cache 17 is to be written to a band 40 of the main storage area 16 of the storage device 15, the controller 11 selects one of the bands 40 to clean and register a request for BRO arbitration. The controller 11 then reads data from the selected band 40 of the main storage area 16 from the media cache 17 and reads the data from that band 40 to stitch the data together. For example, the data residing at the band 40-1 may be in the process of being changed by the new data in the media cache 17. In this regard, the controller 11 may read both pieces of data from the media cache 17 and the band 40-1, delete the portions of the band 40-1 that are being changed, and replace those deleted portions with the new data in the media cache 17.

The controller 11 may perform the stitching of data within the DRAM 51 and then write the stitched data to the media scratchpad 41. The controller 11 may then write the same stitched data to the band 40-1. Afterwards, the controller 11 may delete the data from the media cache 17 as well as the stitched data from the media scratchpad 41 because it is no longer needed. That is, the controller 11 ensures that the stitched data is written to a band 40 before the associated data is deleted from the media scratchpad 41 and the media cache 17.

But, when the data is sequential and continuous, it can flood the DRAM 51 because there may not be enough available adjacent tracks in a band 40 within the SMR medium to store the sequential data. This can result in a performance drop of the storage system 10 as well as a power consumption increase due to the overuse of the DRAM 51. It can also result in overuse of the media cache 17 because the controller 11 has no other place to put the sequential data.

Figures 5A, 5B:
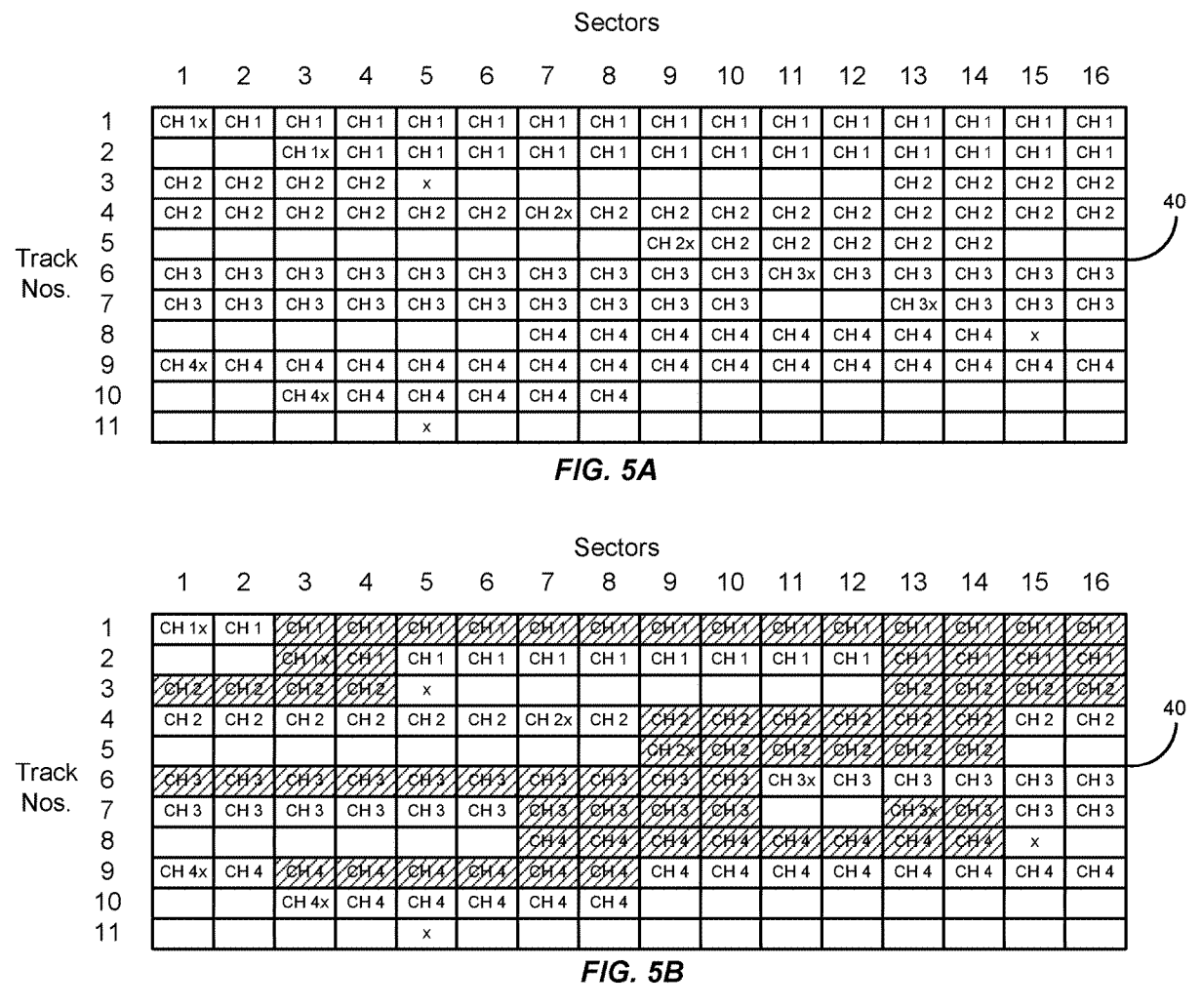

To illustrate, FIG. 5A illustrates an exemplary band 40 having 11 tracks comprising data from four channel input channels CH1-CH4. In this embodiment, the unlabeled sectors indicate where data has not become available from the channels CH1-CH4. And, the remaining sectors are labeled with data from their respective channels that have been received by the DRAM 51. Each track in the band 40 has 16 sectors and that each track has a track skew (e.g., the offset 44 of FIG. 3 labeled with an "x" herein) of two sectors, the first sector of a given track. For example, CH 1 occupies the first 16 sectors of track 1 and continues at track 2 starting with the sector 3 of track 2 labeled CH 1x, with data sector 16 of CH 1 being located just to the left of CH 1x in track 2. In other words, the LBA of CH 1x at track 2 is the continuation of the LBA of track 1 at sector 16. The sectors of the other channels CH 2-CH 4 are similarly established. Now, assume that each channel CH1-CH4 is requesting 40 sectors (a total of 160 sectors) to store new sequential data. If the DRAM 51 has a capacity of 120 sectors of data, the DRAM 51 is full after receiving the first 30 sectors of data from the four input channels CH1-CH4.

The embodiments herein overcome this situation by identifying locations within the band 40 of the main storage area 16 where new incoming sequential data can be written directly from the DRAM 51 to the band 40. In this regard, the controller 11 performs a partial band write operation (BWO) to write as many data sectors as possible to the main storage area 16 of the storage device 15 from the DRAM 51 as opposed to the media cache 17 to free up the DRAM 51 and reduce the dependence on the media cache 17. In doing so, the controller 11 searches for locations where two adjacent sectors exist for data to be written as opposed to just two adjacent tracks. An example of such is illustrated in FIG. 5 B.

In FIG. 5B, the sectors with hatching show where the controller 11 has identified locations in the main storage area 16 to store new sequential incoming data for the channels CH 1-CH 4. Generally, the controller 11 is operable to write data directly to the main storage area 16 from the DRAM 51 where sectors are not adjacent to lower track sectors in which data has not yet become available, as the data is to be written sequentially and writing there would disturb those sectors. In this regard, the controller 11 identifies adjacent sectors where data has been received by the DRAM 51 to write directly from the DRAM 51 to the main storage area 16.

So, briefly returning to FIG. 5A, data for CH 1 that has arrived in the DRAM 51 is dedicated to the sectors 1-16 of track 1 and to the sectors 1-16 of track 2. In FIG. 5B, since the first two sectors of track 2 belonging to CH1 (e.g., data sectors 15 and 16 of the LBA of CH 1) are reserved for data from CH 1 that has not yet become available, the controller 11 does not write to the first two sectors of track 1. So, the controller retains track sectors 1 and 2 of track 1 in the DRAM 51. But, the data for track sectors 3-16 of track 1 can be written directly to the main storage area 16. Similarly, track sectors 3 and 4 of track 2 (e.g., the first two data sectors of track 2 for CH 1 as well as being the data sectors 17 and 18 of the continuous 30 sector LBA of CH 1 in track 2) and the track sectors 13-16 of track 2 belonging to CH 1 (e.g., data sectors 27-30 of the continuous 40 sector LBA request of CH 1 in track 2) can be written to the main storage area 16 as they are adjacent to sectors having data belonging to CH 2 that has been received by the DRAM 51. The track sectors 5-12 of track 2 received by the DRAM 51 and belonging to CH 1 (e.g., data sectors 19-26 of the continuous 30 sector LBA of CH 1 in track 2) are not identified for writing as of yet because those sectors are adjacent to sectors belonging to CH 2 where data has not yet arrived at the DRAM 51 (e.g., track sectors 5-12 of track 3).

To continue with CH 2, incoming sequential data for CH 2 has been received by the DRAM 51 and is dedicated for: track 3, track sectors 1-4 and track sectors 13-16; track 4, track sectors 1-16; and track 5, track sectors 9-14 (the first 30 sectors of the 40 sector LBA request). Since the data of track 3, track sectors 1-4 for CH 2 is adjacent to track sectors in track 4 where data has been received from CH 2 by the DRAM 51, the controller 11 identifies those tracks for writing to the main storage area 16. Similarly, the data of track 3 in track sectors 13-16 are adjacent to data that has arrived from CH 2 by the DRAM 51. So, the controller 11 identifies those sectors as being available to write directly to the main storage area 16 from the DRAM 51. But, since the track sectors 1-8, 15, and 16 of track 4 are adjacent to the track sectors of track 5 where data has not yet arrived, the data of those sectors is retained in the DRAM 51 for later writing. Still continuing, the data of CH 2 dedicated to track sectors 9-13 of track 5 are adjacent to track sectors having data belonging to CH 3 that has been received by the DRAM 51. So, the controller 51 identifies those sectors for writing directly from the DRAM 51 to the main storage area 16, and the process continues similarly with CH 3 and CH 4.

As can be seen in this example, by writing the sequential data from the sectors directly from the DRAM 51 to the main storage area 16 as described above, the controller 11 is operable to free up 74 sectors in the DRAM 51 for new incoming data. And, in doing so, the controller 11 does not need to write any of this data to the media cache 17. In addition to increasing throughput performance of the storage system 10, the embodiments herein also reduce power consumption of the DRAM 51 and the storage device 15.

It should be noted that the above embodiment is merely exemplary and intended to aid the reader in understanding the embodiment. For example, fewer or more channels than those presented may be requesting data storage within the storage device 15. And, the number of track skew sectors is often more than just two sectors. In some instances, the skew can be upwards of 30 or more sectors. Accordingly, the embodiment is intended to be non-limiting.

As mentioned, the above embodiments may be advantageously used in a variety of storage devices. In one specific SMR embodiment, however, another process may be provided to further improve the data throughput of through the buffer 12 (e.g., the DRAM 51) to the main storage area 16 of the SMR medium. First, a brief discussion of the layout of a magnetic recording medium is presented.

Figure 6:
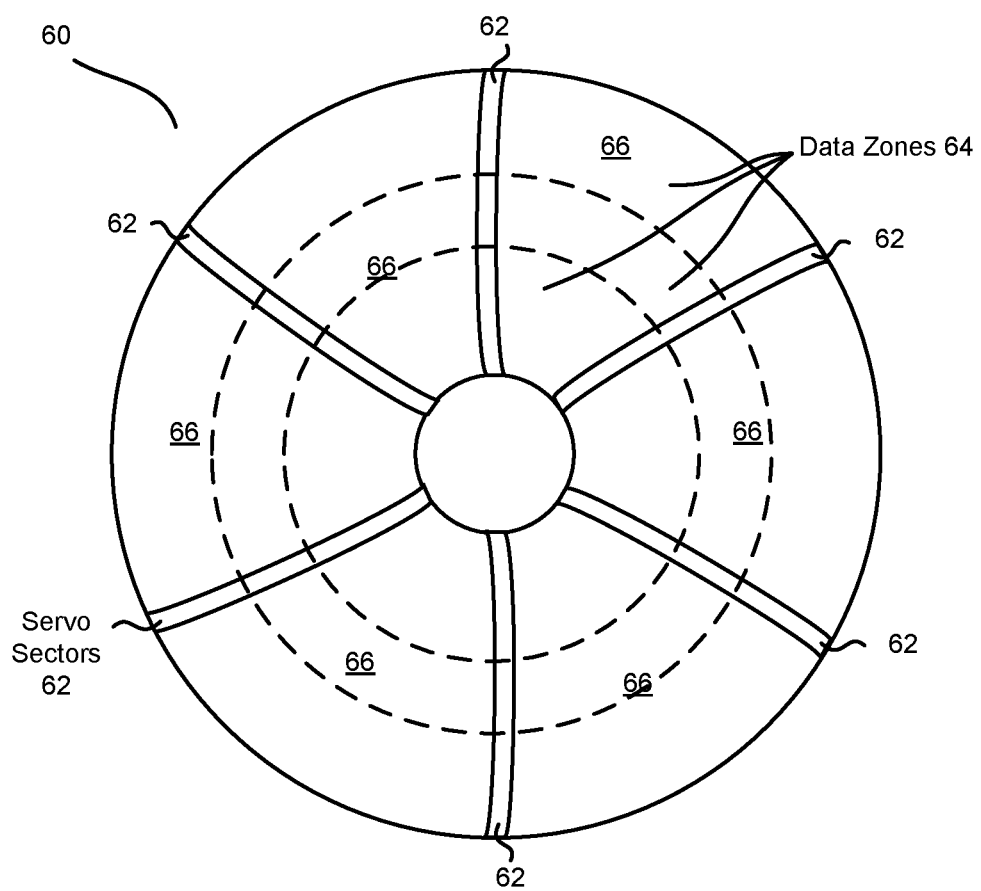
FIGS. 6-8 illustrate exemplary recording mediums.
Figure 7:
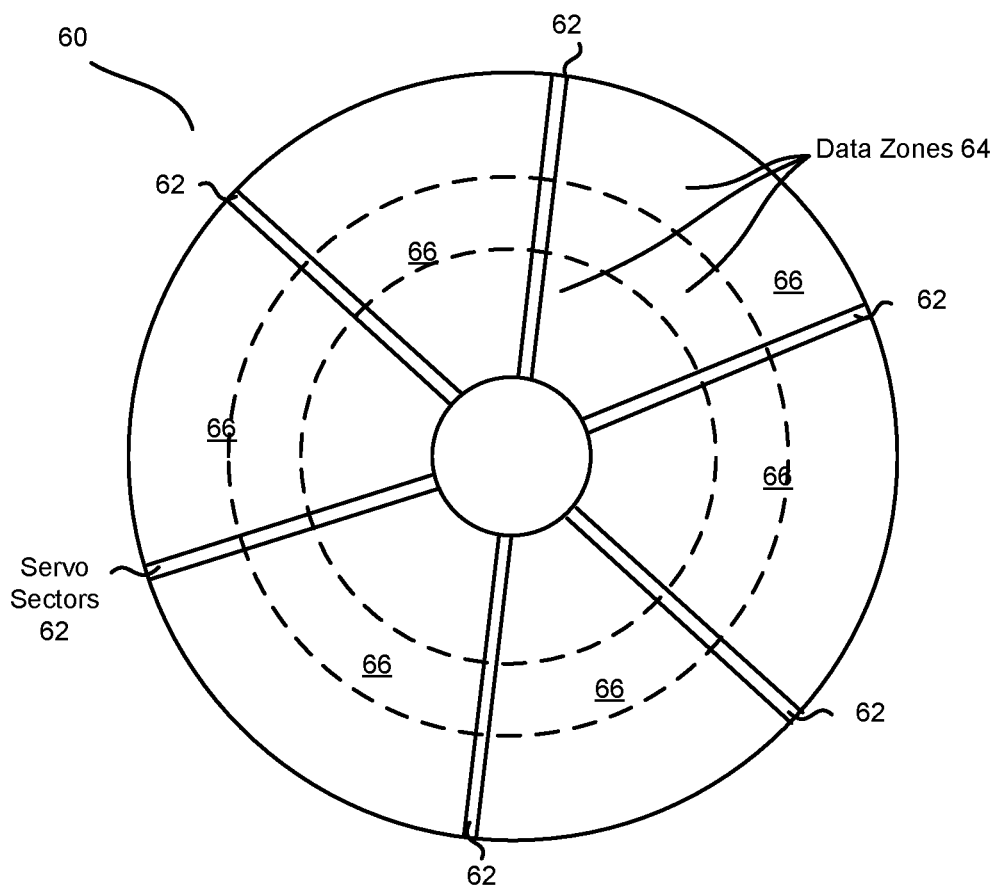

FIG. 6 illustrates an exemplary magnetic disk 60 with arcuate servo wedges 62. FIG. 7 illustrates an exemplary magnetic disk 60 with relatively straight radial servo wedges 62. As can be seen in FIGS. 6 and 7, the data regions 66 of the magnetic disk 60 are separated by the servo wedges 62. Each data zone 64 includes multiple concentric circular data tracks (shown below) with each track being divided into multiple circumferential sectors (e.g., the portions of the data regions 66 separated by the servo wedges 62). Each servo wedge 62 has a sector header which includes servo positioning information for recording data on discrete magnetic tracks of the disk 60.

Figure 8:
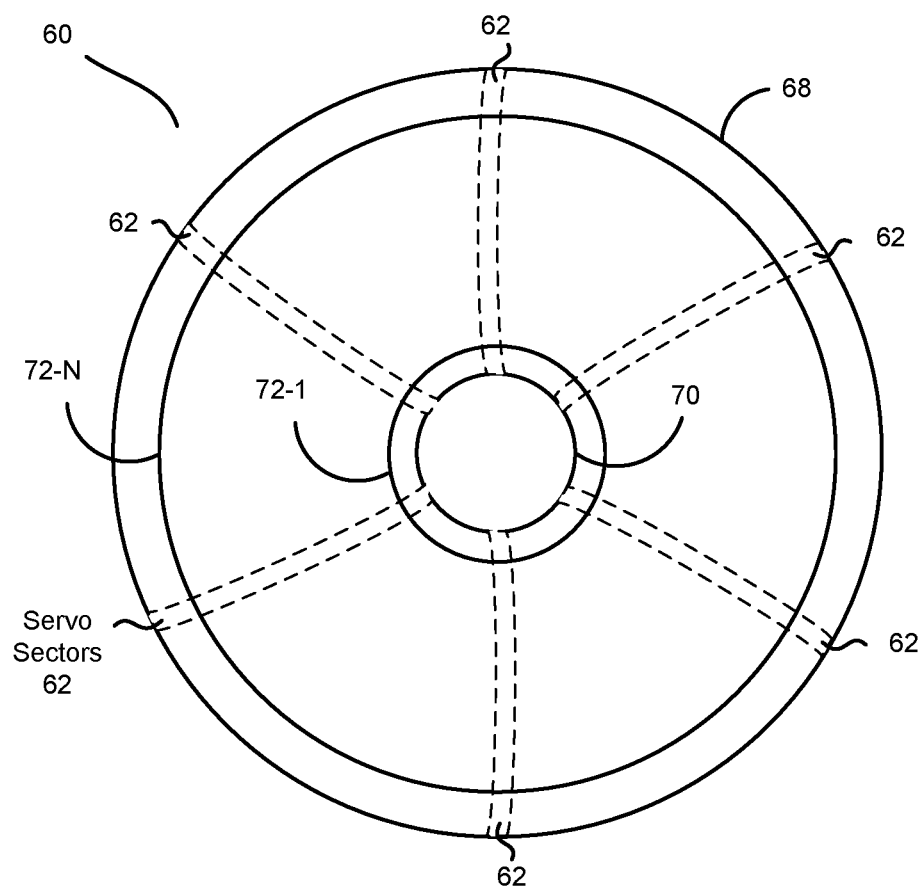

In whatever configuration, tracks 72-1-72-N of the magnetic disk 60 span from the inner diameter 70 to the outer diameter 68 of the magnetic disk 60 where data is written, as illustrated in FIG. 8. Specific data or locations on the disk 60 can be identified with a sector identification ("sector ID") or sector number, and a track identification ("track ID") or track address. This sector ID and track ID are typically part of the servo data located in the servo wedges 62 and used to position the actuator, and thus the read/write head over the disk 60. During operation, as the magnetic disk 60 spins, the read head can read the servo data and use the servo data to move the read/write head over specific tracks 72 to read and write user data.

With respect to this SMR embodiment, the controller 11 is operable to align data sectors with each other in a cross-track direction to further improve the partial BWO. For example, it takes some amount of time, albeit brief, for the actuator to move the read/write heads from one track 72 to another. In order to make the read/write quickly available, the first data sector of one track 72 will lag behind a first data sector of a previous track 72.

Each track 72 includes a fixed number of servo wedges (e.g., 360 servo wedges) and a fixed number of data sectors (e.g., 397 data sectors). Generally, the number of data sectors is constant for a given data zone 64, but this number reduces from the outer diameter 68 to the inner diameter 70 of the magnetic disk 60. The servo wedges, however, may split some of the data sectors, resulting in less recording area because there is gap between a servo wedge and a data sector and because there is a gap between two data sectors.

Figure 9:
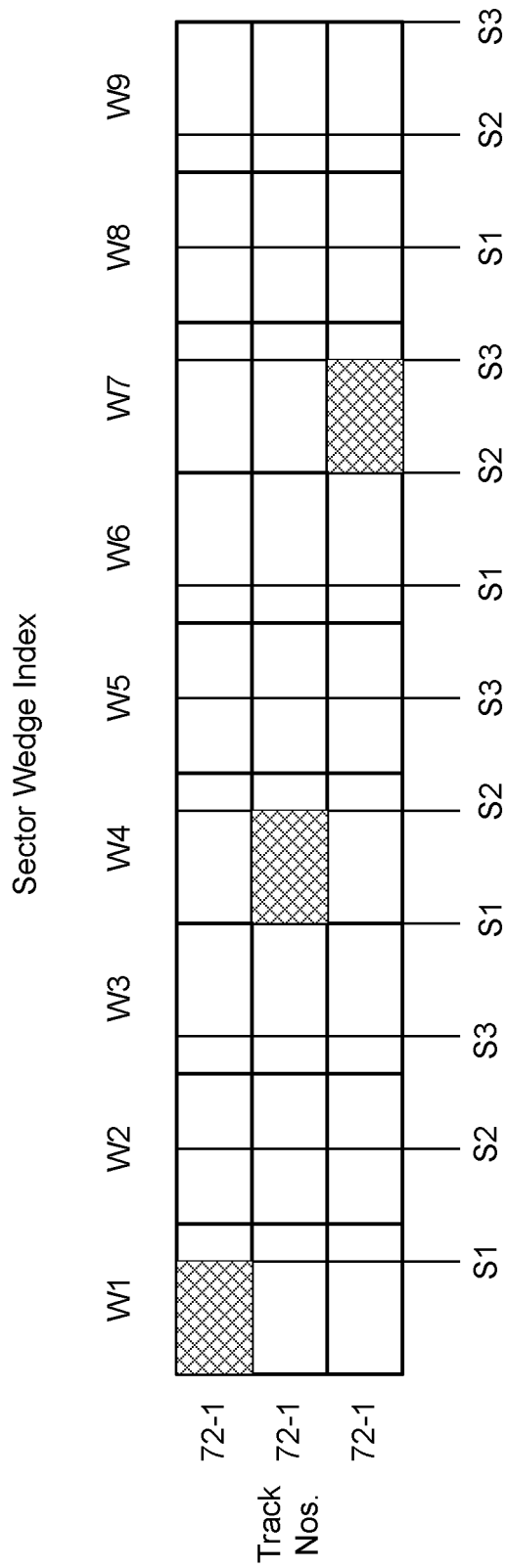
FIG. 9 illustrates exemplary data sector alignment of a recording medium.
Figure 10:
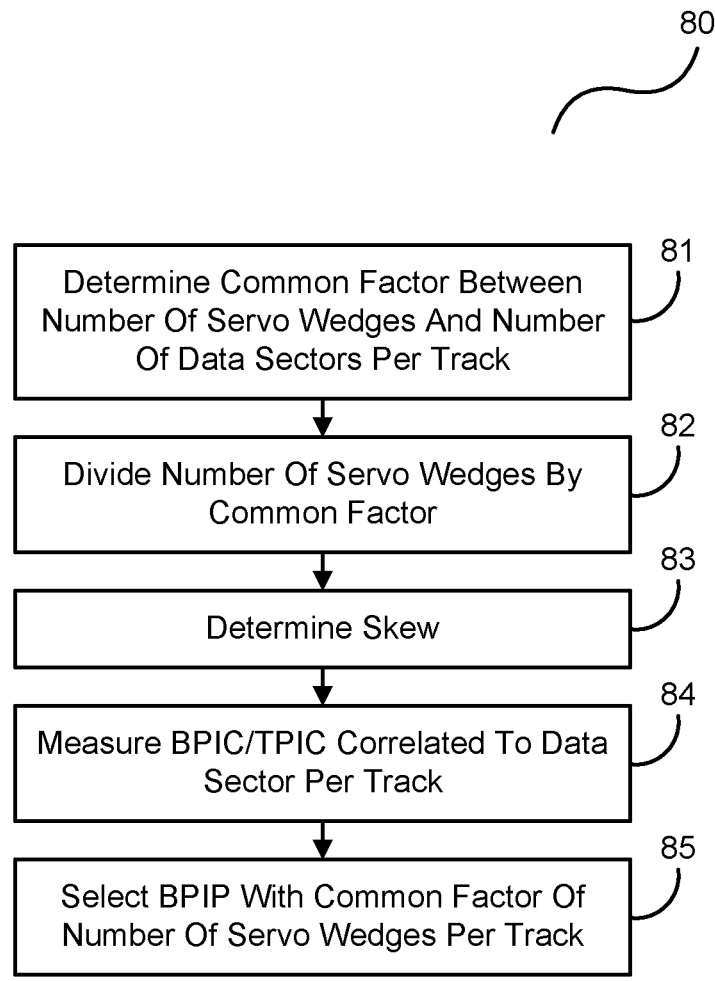
FIG. 10 is a flowchart of another exemplary process of the storage system of FIG.

To compensate for this, controller 11 aligns the data sectors among the tracks 72 for each data zone 64 while reducing data sector splits. To illustrate, FIG. 9 exemplarily shows three tracks 72-1-72-3 with data sectors (illustrated by the sector boundaries 75) spread across a number of servo wedges W1-W9 (e.g., four sectors per three wedges). The controller 11 first determines a number of skew sectors (e.g., the first data sector of each track illustrated by cross hatchings). In doing so and with respect to the process 80 of FIG. 10, the controller 11 determines a common factor (e.g., the greatest common factor) between the number of servo wedges and the number of data sectors per track 72, in the process element 81. Then, in the process element 82, the controller 11 divides the number of servo wedges by the common factor determined in the process element 81. The controller 11, in the process element 83, then determines the number of skew sectors as a factor of the number determined in the process element 81.

With this, the controller 11 tunes the variable bit aspect ratio to minimize the data sector split. For example, the controller 11 may measure the bits per inch capability (BPIC) and the track per inch capability (TPIC) of the magnetic disk 60, in the process element 84, with the BPIC being correlated to the data sectors per track 72 (e.g., 397 data sectors in this example). The controller 11 then selects the desired BPIC with the greatest common factor as the number of servo wedges per track 72, in the process element 85, generally between 98% and 102% of the BPIC. For example, assuming there are 360 servo wedges per track, the BPIC will be 400, and the remaining BPIC is transformed into TPIC. Thus, a total of 80 data sectors go "unsplit" between two servo wedges in this example.

In some embodiments, the number of skew sectors and the skew sector alignment are determined and stored such that the controller 11 can readily implement the above embodiment. Additionally, the embodiments shown and described herein may be combined in various ways as a matter of design choice to improve BWO for a multi-channel input. These embodiments are also useful in reducing data sector splits between servo wedges of a magnetic disk.

Figure 11:
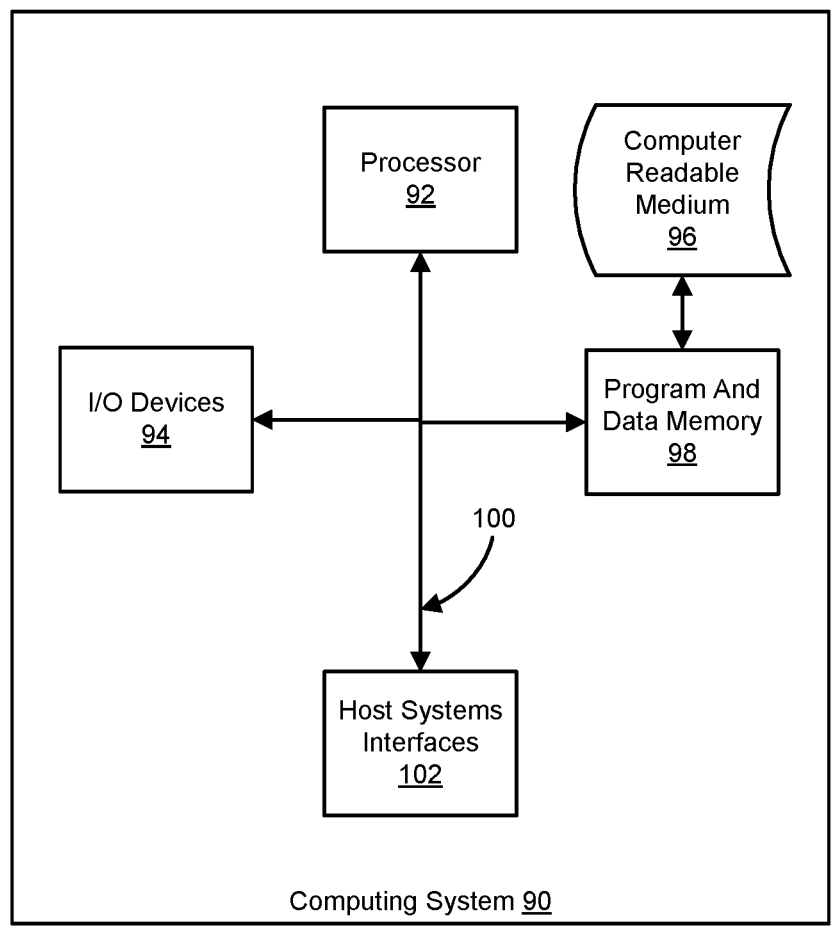
FIG. 11 illustrates a computing system in which a computer readable medium may provide instructions for performing methods disclosed herein.

It should also be noted that the embodiments herein can take the form of hardware, software, or a combination thereof. For example, one software embodiment may include, but is not limited to, firmware, resident software, microcode, etc. FIG. 11 illustrates a computing system 90 in which a computer readable medium 96 may provide instructions for performing any of the methods disclosed herein.

Furthermore, the embodiments can take the form of a computer program product accessible from the computer readable medium 96 providing program code for use by or in connection with a computer or any instruction execution system. For the purposes of this description, the computer readable medium 96 can be any apparatus that can tangibly store the program for use by or in connection with the instruction execution system, apparatus, or device, including the computer system 90.

The medium 96 can be any tangible electronic, magnetic, optical, electromagnetic, infrared, or semiconductor system (or apparatus or device). Examples of a computer readable medium 96 include a semiconductor or solid state memory, magnetic tape, a removable computer diskette, a random access memory (RAM), a read-only memory (ROM), a magnetic disk, and an optical disk. Some examples of optical disks include compact disk-read only memory (CD-ROM), compact disk-read/write (CD-R/W) and DVD.

The computing system 90, suitable for storing and/or executing program code, can include one or more processors 92 coupled directly or indirectly to memory 98 through a system bus 100. The memory 98 can include local memory employed during actual execution of the program code, bulk storage, and cache memories which provide temporary storage of at least some program code in order to reduce the number of times code is retrieved from bulk storage during execution. I/O devices 94 (including but not limited to keyboards, displays, pointing devices, etc.) can be coupled to the system either directly or through intervening I/O controllers. Network adapters may also be coupled to the system to enable the computing system 90 to become coupled to other data processing systems, such as through host systems interfaces 102, or remote printers or storage devices through intervening private or public networks. Modems, cable modem and Ethernet cards are just a few of the currently available types of network adapters.

We claim:

1. A method operable with a storage device, comprising:
   buffering first portions of incoming sequential data from a plurality of channels in a buffer;
   identifying locations of the storage device to store the first portions of the incoming sequential data; and
   directly writing the first portions of the incoming sequential data from the buffer to the identified locations of the storage device, wherein:
   the locations of the storage device are data sectors of a magnetic disk; and
   the method further comprises aligning the data sectors to reduce data sector splits between servo wedges of the magnetic disk.

2. The method of claim 1, wherein:
   the storage device comprises a shingled magnetic recording (SMR) media.

3. The method of claim 2, wherein identifying locations of the storage device to store the first portions of the incoming data further comprises:
   identifying adjacent sectors in a band of tracks of the SMR media to store the first portions of the incoming data.

4. The method of claim 1, wherein aligning the data sectors comprises:
   determining a number of skew sectors for tracks of the magnetic disk based on a number of servo wedges and a number of data sectors per track for each zone of the magnetic disk.

5. The method of claim 1, further comprising:
   buffering second portions of the incoming sequential data in the buffer;
   reading at least one sector of the storage device to retrieve data from a first of the plurality of channels to the buffer;
   stitching the retrieved data from the first channel with the second portion of the incoming sequential data from the first channel; and
   writing the stitched data to the storage device.

6. The method of claim 5, further comprising:
   writing a copy of the stitched data to a scratch pad of the storage device; and
   freeing a cache of the storage device where the retrieved data from the first channel is located.

7. A non-transitory computer readable medium comprising instructions that, when executed by controller of a storage system, directs the controller to:
   buffer first portions of incoming sequential data from a plurality of channels in a buffer;
   identify locations of the storage device to store the first portions of the incoming sequential data; and
   directly write the first portions of the incoming sequential data from the buffer to the identified locations of the storage device, wherein:
   the locations of the storage device are data sectors of a magnetic disk; and
   the computer readable medium further comprises instructions that direct the controller to align the data sectors to reduce data sector splits between servo wedges of the magnetic disk.

8. The computer readable medium of claim 7, wherein:
   the storage device comprises a shingled magnetic recording (SMR) media.

9. The computer readable medium of claim 8, further comprising instructions that direct the controller to identify the locations of the storage device to store the first portions of the incoming data by identifying adjacent sectors in a band of tracks of the SMR media to store the first portions of the incoming data.

10. The computer readable medium of claim 7, further comprising instructions that direct the controller to align the data sectors by determining a number of skew sectors for tracks of the magnetic disk based on a number of servo wedges and a number of data sectors per track for each zone of the magnetic disk.

11. The computer readable medium of claim 7, further comprising instructions that direct the controller:
   buffer second portions of the incoming sequential data in the buffer;

read at least one sector of the storage device to retrieve data from a first of the plurality of channels to the buffer;
stitch the retrieved data from the first channel with the second portion of the incoming sequential data from the first channel; and
write the stitched data to the storage device.

12. A storage system, comprising:
a storage device;
a buffer operable to receive first portions of incoming sequential data from a plurality of channels; and
a controller operable to identify locations of the storage device to store the first portions of the incoming sequential data, and to directly write the first portions of the incoming sequential data from the buffer to the identified locations of the storage device, wherein:
the locations of the storage device are data sectors of a magnetic disk; and
the controller is further operable to align the data sectors to reduce data sector splits between servo wedges of the magnetic disk.

13. The storage system of claim 12, wherein:
the storage device comprises a shingled magnetic recording (SMR) media.

14. The storage system of claim 13, wherein:
the controller is further operable to identify the locations of the storage device to store the first portions of the incoming data by identifying adjacent sectors in a band of tracks of the SMR media to store the first portions of the incoming data.

15. The storage system of claim 12, wherein:
the controller is further operable to align the data sectors by determining a number of skew sectors for tracks of the magnetic disk based on a number of servo wedges and a number of data sectors per track for each zone of the magnetic disk.

16. The storage system of claim 12, wherein:
the controller is further operable to buffer second portions of the incoming sequential data in the buffer, to read at least one sector of the storage device to retrieve data from a first of the plurality of channels to the buffer, to stitch the retrieved data from the first channel with the second portion of the incoming sequential data from the first channel, and to write the stitched data to the storage device.

17. The storage system of claim 16, wherein:
the controller is further operable to write a copy of the stitched data to a scratch pad of the storage device, and to free a cache of the storage device where the retrieved data from the first channel is located.

18. A method operable with a storage device, comprising:
buffering first portions of incoming sequential data from a plurality of channels in a buffer;
identifying locations of the storage device to store the first portions of the incoming sequential data;
directly writing the first portions of the incoming sequential data from the buffer to the identified locations of the storage device;
buffering second portions of the incoming sequential data in the buffer;
reading at least one sector of the storage device to retrieve data from a first of the plurality of channels to the buffer;
stitching the retrieved data from the first channel with the second portion of the incoming sequential data from the first channel; and
writing the stitched data to the storage device.

19. The method of claim 18, wherein:
the storage device comprises a shingled magnetic recording (SMR) media.

20. The method of claim 19, wherein identifying locations of the storage device to store the first portions of the incoming data further comprises:
identifying adjacent sectors in a band of tracks of the SMR media to store the first portions of the incoming data.

21. The method of claim 18, wherein:
the locations of the storage device are data sectors of a magnetic disk; and
the method further comprises aligning the data sectors to reduce data sector splits between servo wedges of the magnetic disk.

22. The method of claim 21, wherein aligning the data sectors comprises:
determining a number of skew sectors for tracks of the magnetic disk based on a number of servo wedges and a number of data sectors per track for each zone of the magnetic disk.

23. The method of claim 18, further comprising:
writing a copy of the stitched data to a scratch pad of the storage device; and
freeing a cache of the storage device where the retrieved data from the first channel is located.

24. A non-transitory computer readable medium comprising instructions that, when executed by controller of a storage system, directs the controller to:
buffer first portions of incoming sequential data from a plurality of channels in a buffer;
identify locations of the storage device to store the first portions of the incoming sequential data;
directly write the first portions of the incoming sequential data from the buffer to the identified locations of the storage device;
buffer second portions of the incoming sequential data in the buffer;
read at least one sector of the storage device to retrieve data from a first of the plurality of channels to the buffer;
stitch the retrieved data from the first channel with the second portion of the incoming sequential data from the first channel; and
write the stitched data to the storage device.

25. The computer readable medium of claim 24, wherein:
the storage device comprises a shingled magnetic recording (SMR) media.

26. The computer readable medium of claim 25, further comprising instructions that direct the controller to identify the locations of the storage device to store the first portions of the incoming data by identifying adjacent sectors in a band of tracks of the SMR media to store the first portions of the incoming data.

27. The computer readable medium of claim 24, wherein:
the locations of the storage device are data sectors of a magnetic disk; and
the computer readable medium further comprises instructions that direct the controller to align the data sectors to reduce data sector splits between servo wedges of the magnetic disk.

28. The computer readable medium of claim 27, further comprising instructions that direct the controller to align the data sectors by determining a number of skew sectors for tracks of the magnetic disk based on a number of servo wedges and a number of data sectors per track for each zone of the magnetic disk.

29. The computer readable medium of claim 24, further comprising instructions that direct the controller:
- write a copy of the stitched data to a scratch pad of the storage device; and
- free a cache of the storage device where the retrieved data from the first channel is located.

30. A storage system, comprising:
- a storage device;
- a buffer operable to receive first portions of incoming sequential data from a plurality of channels; and
- a controller operable to identify locations of the storage device to store the first portions of the incoming sequential data, to directly write the first portions of the incoming sequential data from the buffer to the identified locations of the storage device, to buffer second portions of the incoming sequential data in the buffer, to read at least one sector of the storage device to retrieve data from a first of the plurality of channels to the buffer, to stitch the retrieved data from the first channel with the second portion of the incoming sequential data from the first channel, and to write the stitched data to the storage device.

31. The storage system of claim 30, wherein:
the storage device comprises a shingled magnetic recording (SMR) media.

32. The storage system of claim 31, wherein:
the controller is further operable to identify the locations of the storage device to store the first portions of the incoming data by identifying adjacent sectors in a band of tracks of the SMR media to store the first portions of the incoming data.

33. The storage system of claim 30, wherein:
the locations of the storage device are data sectors of a magnetic disk; and
the controller is further operable to align the data sectors to reduce data sector splits between servo wedges of the magnetic disk.

34. The storage system of claim 33, wherein:
the controller is further operable to align the data sectors by determining a number of skew sectors for tracks of the magnetic disk based on a number of servo wedges and a number of data sectors per track for each zone of the magnetic disk.

35. The storage system of claim 31, wherein:
the controller is further operable to write a copy of the stitched data to a scratch pad of the storage device, and to free a cache of the storage device where the retrieved data from the first channel is located.

36. The computer readable medium of claim 11, further comprising instructions that direct the controller to:
- write a copy of the stitched data to a scratch pad of the storage device; and
- free a cache of the storage device where the retrieved data from the first channel is located.

* * * * *